(12) United States Patent     (10) Patent No.: US 7,029,227 B2
Berthillier et al.     (45) Date of Patent: Apr. 18, 2006

(54) STRUCTURE COMPRISING A ROTOR AND FIXED PERTURBATION SOURCES AND METHOD FOR REDUCING VIBRATIONS IN SAID STRUCTURE

(75) Inventors: Marc Berthillier, Yerres (FR); Yvon Cloarec, Echouboulans (FR); Eric Seinturier, Chartrettes (FR)

(73) Assignee: Snecma Moteurs, Paris (FR)

( * ) Notice: Subject to any disclaimer, the term of this patent is extended or adjusted under 35 U.S.C. 154(b) by 104 days.

(21) Appl. No.: 10/477,234

(22) PCT Filed: May 10, 2002

(86) PCT No.: PCT/FR02/01593

§ 371 (c)(1),
(2), (4) Date: Nov. 10, 2003

(87) PCT Pub. No.: WO02/092969

PCT Pub. Date: Nov. 21, 2002

(65) Prior Publication Data

US 2004/0175260 A1    Sep. 9, 2004

(30) Foreign Application Priority Data

May 11, 2001 (FR) .................................. 01 06237

(51) Int. Cl.
*F03D 1/02* (2006.01)
(52) U.S. Cl. .......................... 415/1; 415/119; 415/183; 416/203
(58) Field of Classification Search ............... 415/119, 415/194, 195, 183, 1; 416/203, 500
See application file for complete search history.

(56) References Cited

U.S. PATENT DOCUMENTS 1,534,721 A * 4/1925 Lasche ...................... 415/195
3,006,603 A * 10/1961 Caruso et al. .............. 415/195
3,883,264 A     5/1975 Rao (Continued)

FOREIGN PATENT DOCUMENTS

FR     2 617 914     1/1989

*Primary Examiner*—Edward K. Look
*Assistant Examiner*—Igor Kershteyn
(74) *Attorney, Agent, or Firm*—Oblon, Spivak, McClelland, Maier & Neustadt, P.C.

(57) ABSTRACT

A method of reducing vibration in a structure comprising at least one rotor ($101_j$) and a fixed set of sources of disturbance ($102_j$) liable to give rise to disturbances in the fluid flow (11) that cause the rotor to vibrate, the method comprising a step of distributing the fixed sources of disturbance angularly in non-uniform manner so as to reduce the amplitude of excitation as seen by the rotor, and a step which consists in verifying that the maximum amplitude of a response of the rotor to the excitation is obtained by:
  determining a first signal whose Fourier transform corresponds to the frequency spectrum of the excitation in the event of the fixed sources of disturbance being distributed in a predetermined angular distribution;
  by modifying the first signal into a second signal adapted to said selected angular distribution for the fixed sources of disturbance;
  by determining the frequency spectrum of the excitation by calculating the Fourier transform of the second signal; and
  by calculating the response of the rotor to the excitation on the basis of the frequency spectrum of the excitation.

35 Claims, 8 Drawing Sheets

U.S. PATENT DOCUMENTS

| | | |
|---|---|---|
| 4,253,800 A | 3/1981 | Segawa et al. |
| 5,123,241 A * | 6/1992 | Lotan .......................... 415/195 |
| 5,342,167 A * | 8/1994 | Rosseau ..................... 415/119 |
| 5,470,200 A | 11/1995 | Tupov et al. |
| 5,993,161 A | 11/1999 | Shapiro |
| 6,439,838 B1 * | 8/2002 | Crall et al. ................. 415/119 |

* cited by examiner

STRUCTURE COMPRISING A ROTOR AND FIXED PERTURBATION SOURCES AND METHOD FOR REDUCING VIBRATIONS IN SAID STRUCTURE

FIELD OF THE INVENTION

The present invention relates in general terms to reducing vibration in a structure including both a rotor and fixed sources of disturbance. The term "reducing vibration" is used to mean reducing vibration amplitude.

The rotor and the fixed sources of disturbance in the structure are placed in a fluid flow. The fixed sources of disturbance are, for example, the blades of a stator. In a particular application of the invention, the above-specified structure is a turbomachine.

The fixed sources of disturbance generate pressure variations in the fluid flow, which variations can propagate throughout the structure, both downstream and upstream, and can cause the rotor to vibrate.

DESCRIPTION OF THE PRIOR ART

Figures 1, 2:
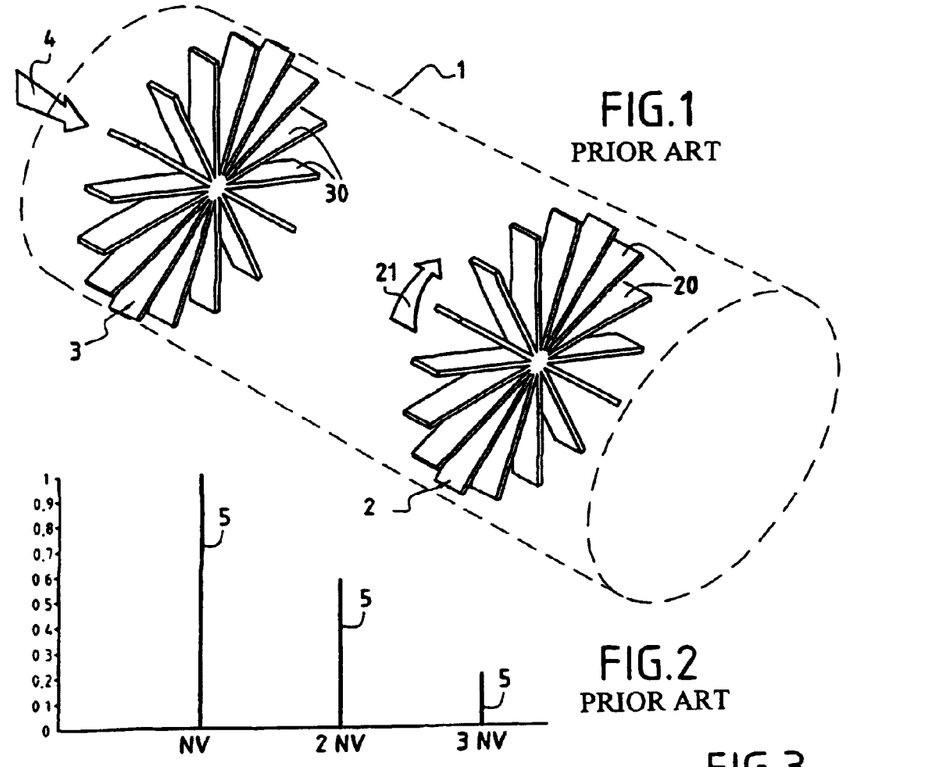
FIG. 1, described above, is a diagrammatic perspective view of a portion of a turbomachine comprising a rotor and a stator.
FIG. 2, described above, shows the frequency spectrum of excitation as seen by the rotor of FIG. 1.

FIG. 1 shows a conventional structure given reference 1, comprising a rotor 2 and a stator 3 subjected to a fluid flow 4. The rotor 2 and the stator 3 comprise respective blades 20 and 30 disposed radially in uniform manner, i.e. the angle between any two given blades is constant. In well known manner, the blades 20 and 30 serve to modify the pressure of the fluid, either to compress it or to expand it. The rotor 2 turns as indicated by arrow 21, and it perceives the respective wakes from the blades 30 of the stator 3 in the fluid flow 4 as turning disturbances.

More particularly, when the number of stator blades 30 is written N and when the speed of rotation of the rotor 2 expressed in hertz (Hz) is written V, then the rotor 2 is subjected to excitation having a fundamental frequency NV, a first harmonic frequency 2NV, a second harmonic frequency 3NV, etc.

FIG. 2 shows the excitation spectrum coming from the stator 3 as received by the rotor 2. This spectrum has three lines 5 corresponding respectively to the fundamental frequency and to the first two harmonic frequencies. In the example shown in FIG. 2, the portion of the excitation corresponding to harmonics higher than the frequency 3NV is ignored.

The response of the rotor 2 to this excitation is a function of the natural frequencies of the rotor, which depend on the shape, the material, and the speed of rotation of the rotor. If at a given speed of rotation the natural frequencies of the rotor do not coincide with any of the spectrum lines 5 shown in FIG. 2, then when the rotor is operating at this speed it is disturbed little by the wakes of the blades 30 in the flow 4. Otherwise, if at a particular speed one of the natural frequencies of the rotor 2 coincides with one or other of the spectrum lines 5, then the rotor 2 is subjected to resonance which makes it vibrate. It is important to avoid vibration of the rotor 2 as much as possible since such vibration can lead to damage, and give rise to the rotor rupturing due to vibratory fatigue.

Figure 3:
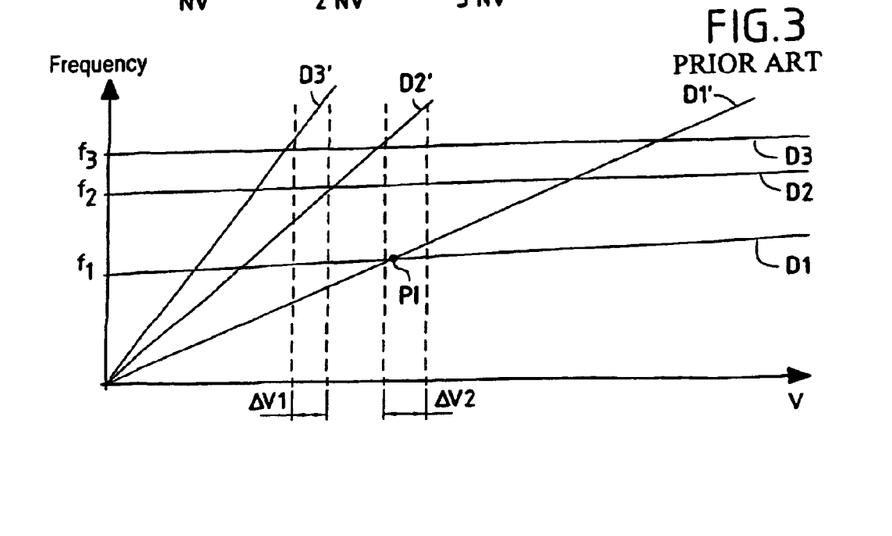
FIG. 3, described above, is a Campbell diagram corresponding to the portion of the turbomachine shown in FIG. 1.

As a general rule, particularly in turbomachines, the rotor 2 must be capable of being used over an entire range of speeds of rotation, as to enable a plurality of operating conditions to exist. FIG. 3 is a Campbell diagram in which straight lines Di represent the relationship between the natural frequencies of the rotor, written $f_i$, and the speed of rotation V of the rotor, and straight lines D1', D2', and D3' show the relationship between the excitation frequencies NV, 2NV, and 3NV, and said speed of rotation V of the rotor. To clarify the drawing, only three natural frequencies $f_1$, $f_2$, $f_3$ and only three corresponding lines D1, D2, and D3 are drawn in FIG. 3.

Two situations can arise depending on the range of speeds of rotation of the rotor:

- if the rotor is rotating in a range of speeds $\Delta V1$ in which no coincidence occurs between the natural frequencies $f_i$ of the rotor 2 and the excitation frequencies NV, 2NV, and 3NV, then the rotor 2 is little affected in operation by the disturbances generated in the fluid flow by the stator 3; or else
- if the range of speeds of rotation of the rotor 2 is a range $\Delta V2$ in which there are one or more points of coincidence between the natural frequencies $f_i$ of the rotor and the excitation frequencies NV, 2NV, and 3NV (these points of coincidence corresponding to points of intersection PI where the lines Di cross the lines D1', D2', and D3', only one of which points is shown in FIG. 3), then a resonance effect occurs in the rotor 2 at each of these points of coincidence.

To solve the problem of vibration in the rotor 2 due to the blades 30 of the stator 3 that arise at a given speed of rotation V when a natural frequency of the rotor 2 coincides with an excitation frequency NV, 2NV, or 3NV, it is known to modify the shape of the rotor 2 by acting on its mass and its stiffness so as to change its natural frequencies.

That method makes it possible to eliminate one or more troublesome coincidences. However, it often happens that by shifting the natural frequencies of the rotor in that way, other coincidences are caused to appear in the range of speeds of rotation. Sometimes it is even practically impossible to prevent all coincidences between the natural frequencies of the rotor and the excitation frequencies within said range of speeds. In addition, changing the shape of the rotor often leads to degrading its aerodynamic performance.

When the above-described method is inappropriate, an alternative solution consists in damping the vibrations of the rotor, either by friction or shear, or by aeroelastic damping. Nevertheless, damping by friction or shear is quite complicated to implement, particularly when the rotor is made as a single piece. As for aeroelastic damping, it is necessary to use a rotor that is not symmetrical, for example of the type described in document EP-A-0 921 274. Unfortunately, it is difficult to guarantee that such a non-symmetrical rotor behaves well in rotation.

OBJECTS AND SUMMARY OF THE PRESENT INVENTION

The present invention seeks to provide a method of reducing vibration in a structure including both a rotor and fixed sources of disturbance, which method facilitates designing and manufacturing said structure.

To this end, the invention provides a method of reducing vibration in a structure comprising at least one rotor and at least one stator, the rotor and the stator being designed to be subjected to a fluid flow, the structure including a set of fixed sources of disturbance liable to give rise to disturbances in the fluid flow that cause the rotor to vibrate, the method being characterized in that: during design of the structure, a non-uniform angular distribution is selected for the fixed sources of disturbance so as to reduce the amplitude of excitation seen by the rotor and corresponding to said disturbances at at least one excitation frequency that coincides substantially with a natural frequency of the rotor at a speed of rotation V thereof, as compared with a predetermined uniform angular distribution of the fixed sources of disturbance; and in that said method further comprises a step consisting in verifying over an entire range of speeds of rotation at which the rotor is liable to rotate and including the speed of rotation V, that the maximum amplitude of a response of the rotor to the excitation when the fixed sources of disturbance are distributed in said selected angular distribution is less than the maximum amplitude when the fixed sources of disturbance are distributed in said predetermined angular distribution, said response of the rotor to the excitation when the fixed sources of disturbance are distributed in said selected angular distribution being obtained by implementing the following steps:

determining a first signal whose Fourier transform corresponds to the frequency spectrum of the excitation when the fixed sources of disturbance are distributed in said predetermined angular distribution;
  modifying the first signal into a second signal adapted to said selected angular distribution for the fixed sources of disturbance;
  determining the frequency spectrum of the excitation by calculating the Fourier transform of the second signal; and
  calculating the response of the rotor to the excitation on the basis of the frequency spectrum of the excitation.

Thus, in the invention, rotor vibration is reduced not by changing the structure or the shape of the rotor, as in the prior art, but by modifying the angular distribution of the fixed sources of disturbance, so as to modify correspondingly the frequency spectrum of the excitation, as seen by the rotor and as generated by the fixed sources of disturbance. In the invention there is no need to make the rotor non-symmetrical. The design and manufacture of the structure are thus made easier in the sense that difficulties associated with rotation of a non-symmetrical rotor are avoided. Unlike the rotor, the set of sources of disturbance is static and can easily be made non-symmetrical without that leading to particular problems of design or manufacture.

By using an angular distribution of fixed sources of disturbance that is not uniform, the frequency spectrum of the excitation seen by the rotor is enriched with additional spectrum lines when compared with the conventional configuration as shown in FIG. 1 where the sources of disturbance are regularly distributed. However the total energy of disturbance produced by the set of sources of disturbance in the invention is the same as that which the same sources of disturbance would produce if they were regularly distributed. The intensity of the spectrum lines corresponding to the frequencies NV, 2NF, 3NV, etc., and in particular of the troublesome spectrum line that coincides with the above-specified natural frequency of the rotor, is thus reduced, thereby weakening vibration of the rotor.

In an implementation of the invention, the fixed sources of disturbance are identical (ignoring manufacturing tolerances); and at least one natural frequency of the rotor at the speed of rotation V is substantially equal to NV or a multiple of NV, where N is the number of fixed sources of disturbance in said set. The term "identical" is used to mean that the fixed sources of disturbance produce the same disturbance in the fluid flow.

Typically, the first signal comprises identical peaks that are regularly spaced apart, each peak being representative of a disturbance created by a fixed source of disturbance in the fluid flow, the spacing between two given consecutive peaks being representative of the angle defined by two consecutive sources of disturbance when the sources of disturbance are distributed in said uniform angular distribution, and the modification step consists in adapting the spacings between the peaks to the angles of said selected angular distribution.

In practice, the set of fixed sources of disturbance may be situated upstream or downstream from the rotor in the fluid flow, however it is preferably situated upstream since it is in this situation that the disturbance generated by the set of sources of disturbance propagates better and is more likely to affect the rotor.

Preferably, the fixed sources of disturbance are substantially in the same radial position relative to a point in the fluid flow corresponding to a center of rotation of the rotor.

In a particular application of the invention, the fixed sources of disturbance are stator blades.

In another application, the fixed sources of disturbance are of one of the following types: injectors of a combustion chamber; elements for extracting cooling air; discharge valves; elements for re-injecting cooling air; sensors; and probes.

Typically, the above-mentioned structure may constitute a turbomachine.

The present invention also provides a method of designing a structure comprising at least one rotor and at least one stator, the rotor and the stator being designed to be subjected to a fluid flow, the structure including a set of fixed sources of disturbance liable to give rise to disturbances in the fluid flow causing the rotor to vibrate, the method being characterized in that it comprises the steps consisting in: determining an overall architecture for the structure; and applying to said structure the above-defined method of reducing vibration.

The present invention also provides a method of designing and manufacturing a structure comprising at least one rotor and at least one stator, the rotor and the stator being designed to be subjected to a fluid flow, the structure including a set of fixed sources of disturbance liable to give rise to disturbances in the fluid flow causing the rotor to vibrate, the method being characterized in that it comprises the steps consisting in: determining an overall architecture for the structure; applying to said structure the above-defined method of reducing vibration; and manufacturing said structure.

In the conventional case of identical stator blades that are regularly distributed, the intensities of the frequency spectrum lines of the excitation seen by the rotor when turning at a given speed of rotation can be large. Consequently, when a natural frequency of the rotor at this speed coincides with one of the spectrum lines, then the rotor is subjected to a large amount of resonance, which can be very damaging.

The present invention thus also seeks to provide a structure comprising a rotor and a set of identical fixed sources of disturbance, enabling the intensity of any resonance effects of the rotor to be reduced, and in particular ensuring that such effects cannot reach the intensity values that are observed with conventional structures, and with this being achieved without excessively affecting the aerodynamic efficiency of the structure.

To this end, the invention provides a structure comprising: at least one rotor; at least one stator; and a set comprising a number N of fixed sources of disturbance; the rotor and the set of fixed sources of disturbance being designed to have a fluid flow passing substantially perpendicularly therethrough, in which flow the set of sources of disturbance is liable to give rise to disturbances which are subsequently received by the rotor; the set of sources of disturbance forming a set of N adjacent angles in a plane substantially perpendicular to the fluid flow, where the sum of said angles is equal to 360°, each angle being defined by two consecutive half-lines having a common point as their origin, which point corresponds, in the fluid flow, to a center of rotation of the rotor, the half-lines also passing through the respective geometrical centers of two sources of disturbance; the structure being characterized in that the set of adjacent angles comprises at least one group of "large" angles that are greater than 360°/N, and at least one group of "small" angles that are less than 360°/N.

The terms "large angle" and "small angle" are used in the invention to designate an angle of value that is respectively greater than or less than a given value, allowance being made for manufacturing tolerances. In other words, two angles are considered as being equal if they have the same value, ignoring manufacturing tolerances. In general, manufacturing tolerances are smaller than 0.05°.

In the structure of the invention as defined above, the sources of disturbance are arranged in non-uniform manner, such that the frequency spectrum of the excitation seen by the rotor includes, as explained above for the method of the invention, spectrum lines that are additional to those of the conventional configuration, as shown in FIG. 1, where the sources of disturbance are regularly distributed. More particularly, the portion of the excitation corresponding to each large angle presents a fundamental frequency that is below the frequency NV (i.e. the fundamental frequency in the conventional case), whereas the portion of the excitation corresponding to each small angle presents a fundamental frequency greater than the frequency NV.

Since the disturbing energy produced by the set of sources of disturbance in the invention is the same as that which the same sources of disturbance would produce if they were regularly distributed, the intensity of the spectrum lines corresponding to the excitation frequencies NV, 2NV, 3NV, etc. is thus reduced, thereby decreasing the amplitude of rotor resonance when one or more natural frequencies of the rotor coincide with one or more excitation frequencies.

In addition, the intensity of the strongest spectrum line of the excitation is reduced, thereby reducing the risk of the rotor resonating very strongly.

The effect of reducing the intensities of the troublesome lines in the excitation spectrum corresponding to the frequencies NV, 2NV, 3NV, etc. is reinforced by the fact that in the set of adjacent angles, large angles are grouped together, as are small angles. When the rotor turns through an angle corresponding to a group of large angles (or small angles), the excitation which it receives comprises not only the frequency corresponding to each large angle (or small angle), but also frequencies that are multiples of said frequency.

As a result, it is possible to reduce the intensity of the troublesome lines in the spectrum without it being necessary to modify excessively the overall shape of the sources of disturbance. Conserving a shape for the set of sources of disturbance that is as close as possible to a uniform shape, in which the angular distribution of the sources of disturbance is uniform, avoids the aerodynamic efficiency of the structure being affected to too great an extent.

Preferably, the set of adjacent angles includes at least one "nominal" angle equal to 360°/N. The presence of one or more nominal angles avoids sudden changes of angle between the large angles and the small angles, thereby reducing losses of aerodynamic efficiency due to the fact that the angular distribution of the sources of disturbance is not uniform.

In a preferred embodiment of the structure of the invention, the set of adjacent angles comprises a single group of adjacent large angles and a single group of adjacent small angles. More particularly, the set of adjacent angles may be constituted by:

a single group of adjacent large angles;

a first nominal angle or a first group of adjacent nominal angles, adjacent to said single group of adjacent large angles;

a single group of adjacent small angles which is adjacent to said first nominal angle or to said first group of adjacent nominal angles; and a second nominal angle or a second group of adjacent nominal angles, adjacent to said single group of adjacent small angles:

In a variant of the preferred embodiment, the set of adjacent angles is constituted by a single group of adjacent large angles and a single group of adjacent small angles, and thus does not include a nominal angle.

Grouping together the large angles and the small angles as single groups, as is done in the preferred embodiment of the invention, serves to increase the intensities of the additional lines of the excitation spectrum seen by the rotor, thereby further reducing the intensities of the lines corresponding to the frequencies NV, 2NV, 3NV, etc. This preferred embodiment is thus particularly advantageous when the natural frequency of the rotor coincides with one of said frequencies NV, 2NV, 3NV, etc. since it significantly reduces the intensity of the troublesome line while having little affect on the aerodynamic efficiency of the structure (a satisfactory effect is obtained even if the large and small angles differ little from 360°/N).

In other embodiments of the invention, the set of adjacent angles comprises a plurality of groups of adjacent large angles and a plurality of groups of adjacent small angles, interposed between groups of adjacent large angles. The set of adjacent angles may further include a plurality of nominal angles or of groups of adjacent nominal angles, each nominal angle or group of adjacent nominal angles being adjacent both to a group of adjacent large angles and to a group of adjacent small angles.

In a variant, the set of adjacent angles may be constituted by a plurality of groups of adjacent large angles and a plurality of groups of adjacent small angles, each group of adjacent small angles being adjacent to two groups of adjacent large angles. Under such circumstances, the set of adjacent angles therefore does not include any nominal angle.

Preferably, in the various embodiments defined above, all of the large angles of the set of adjacent angles are made larger by the same predetermined value, and all of the small angles of the set of adjacent angles are made smaller by said predetermined value.

Nevertheless, it is possible to envisage that at least two large angles and/or at least two small angles in the set of adjacent angles are different from each other.

Typically, the set of adjacent angles may comprise as many large angles as it comprises small angles.

Advantageously, in order to avoid excessive loss of aerodynamic efficiency, each large angle and each small angle in the set of adjacent angles differs from 360°/N by no more than 10%, and preferably by more than 5%.

DESCRIPTION OF EMBODIMENTS OF THE INVENTION

A method of designing and manufacturing a turbomachine in accordance with the present invention is described in detail below with reference to FIG. 4.

In a first step E1, the overall architecture of the turbomachine is determined in well-known manner by simulation, starting from initial specifications that define, amongst other things, the desired power and energy consumption. Step E1 consists more particularly in determining the number of stator-rotor stages, the number of blades per stage, and the profiles of the blades for obtaining aerodynamic performance satisfying the initial specifications.

Figure 5:
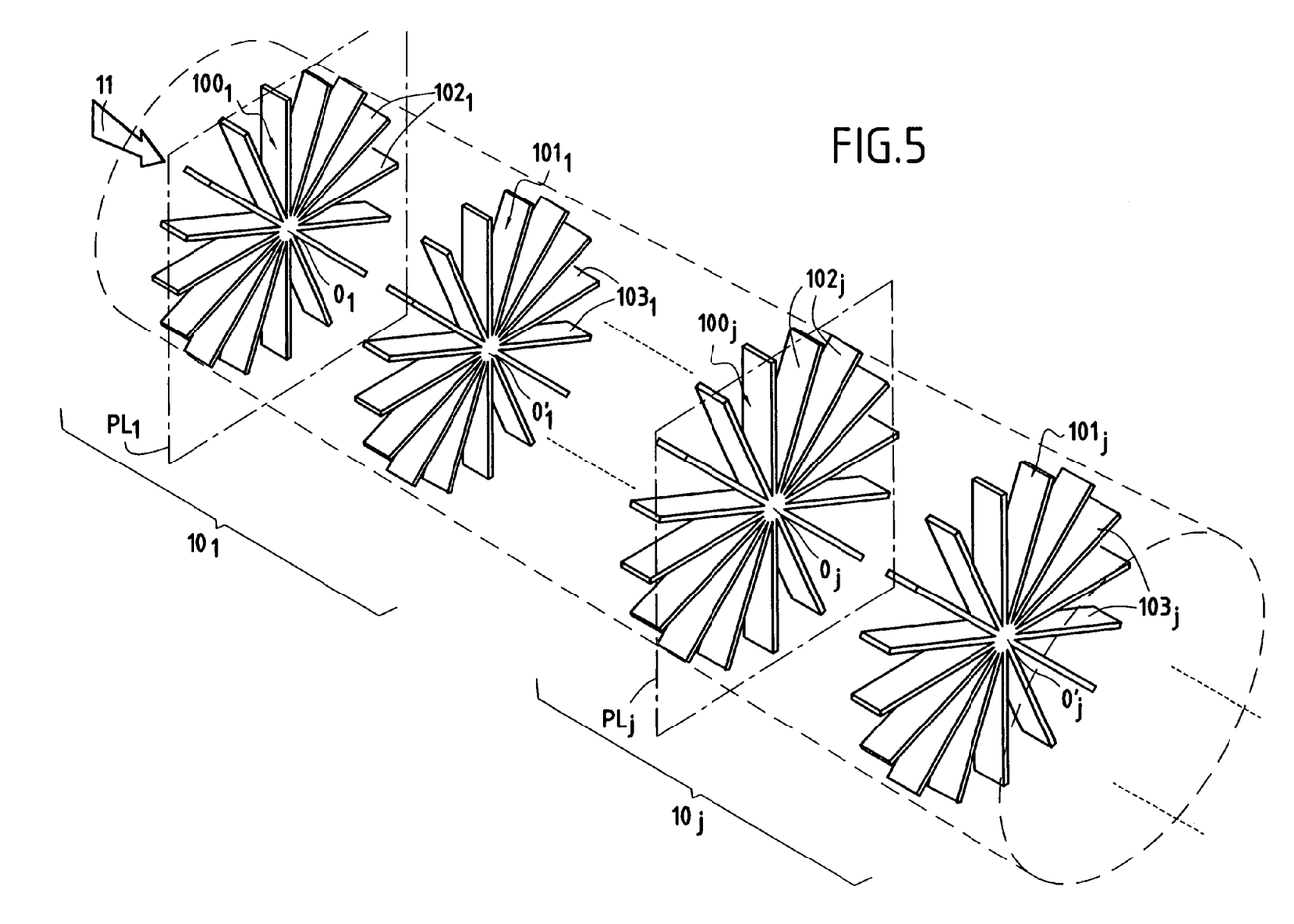
FIG. 5 is a diagrammatic perspective view of a portion of a turbomachine comprising a plurality of stator-rotor stages.

At the end of this first step, a structure of the type shown in FIG. 5 is obtained in the form of digital data, the structure comprising a number J of stator-rotor stages $10_1$ to $10_J$. Each stage $10_j$ where i is an integer in the range 1 to J comprises a stator $100_j$ in the form of a fixed bladed wheel, and a rotor $101_j$ of the moving bladed wheel type. The blades of each stator $100_j$ are designated in FIG. 5 by reference $102_j$ and the blades of each rotor $101_j$ are designated by the reference $103_j$.

The various stator-rotor stages are arranged so that in operation a flow of fluid 11 passes through them perpendicularly thereto. In each stage $10_j$, the stator $100_j$ situated upstream from the associated rotor $101_j$ generates pressure disturbances in the flow 11 which are then received by the rotor $101_j$. The response of the rotor to these disturbances depends on the excitation frequencies seen by the rotor and on its natural frequencies.

Figure 6:
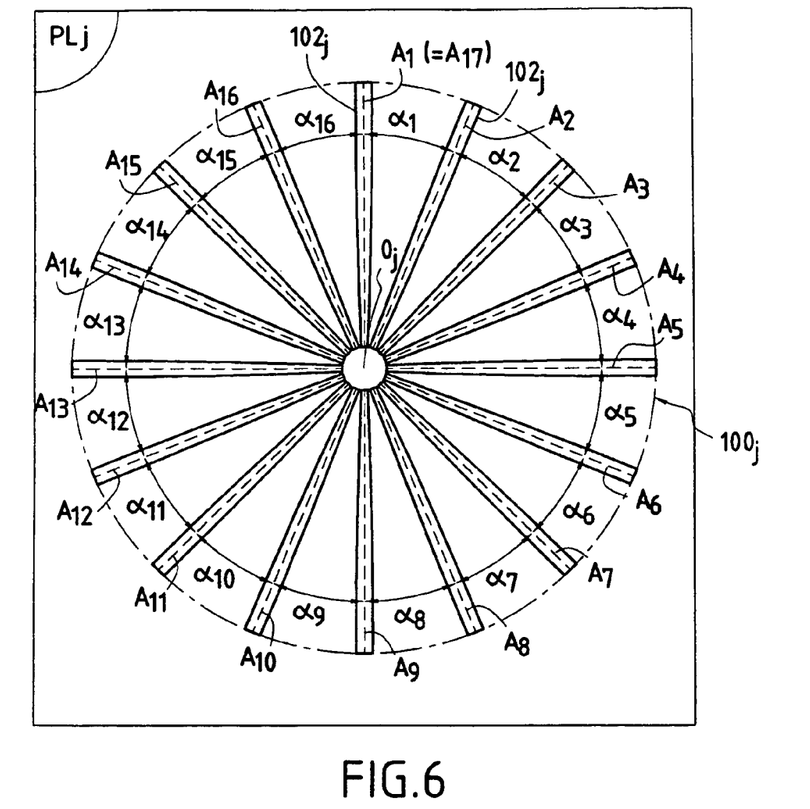
FIG. 6 is a diagrammatic end view of a stator in the portion of a turbomachine as shown in FIG. 5.

The stator blades $102_j$ of a given stage together constitute a set of N fixed sources of disturbance that are identical (the number N may vary from one stage to another). In FIGS. 5 and 6, each stator (and rotor) is shown as having a number of blades that is equal to 16. In practice, the number N generally lies in the range 16 to 200.

As shown in FIG. 5, the N fixed sources of disturbance $102_j$ define a set of N adjacent distribution angles $\alpha_1$ to $\alpha_N$ in a plane $PL_j$ perpendicular to the flow direction of the fluid 11, where the sum of the distribution angles is equal to 360°. Each angle $\alpha_i$, where i is an integer in the range 1 to N, is defined by two half-lines $A_i$, $A_{i+1}$ having a common point $O_j$ as their origin, which point is situated substantially facing a point of rotation $O'_j$ of the associated rotor $101_j$, said lines passing respectively through the geometrical centers (not shown) of two consecutive blades $102_j$. In the example of FIG. 6, the half-lines $A_1$ to $A_N$ are central axes of the blades $102_j$.

With reference again to FIG. 4, after step E1, steps E2 to E7 are implemented for each stator-rotor stage $10_j$.

Figure 7:
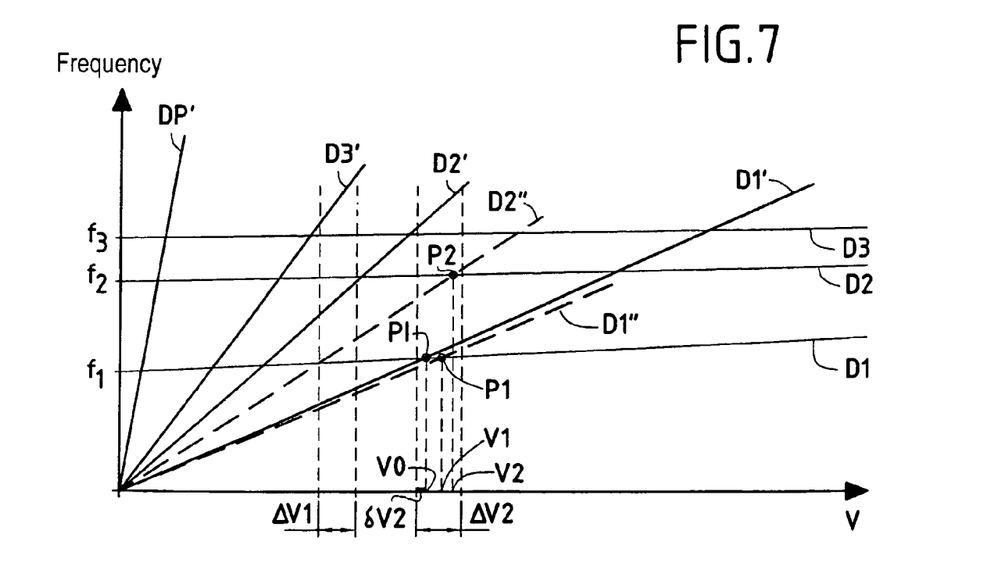
FIG. 7 is a Campbell diagram corresponding to a stator-rotor stage of the portion of the turbomachine shown in FIG. 5.

In step E2, the natural frequencies of the rotor, designated by $f_i$ are calculated and then plotted on a Campbell diagram in the form of straight lines Di representing the relationship between the natural frequencies and the speed of rotation V of the rotor, expressed in Hz (cf. FIG. 7). Straight lines D1' to DP' are also plotted on the same Campbell diagram, where P is a predetermined integer, said lines passing through the origin of the diagram and having respective slopes N, 2N, 3N, . . . , PN. The straight lines D1' to DP' represent the relationship between the excitation frequencies seen by the rotor $101_j$ when the blades $102_j$ of the stator $100_j$ are regularly distributed (i.e. when the angles $\alpha_1$ to $\alpha_N$ are equal), as shown in FIG. 6. The choice of the predetermined number P depends on the extent to which it is desired to reduce vibration of the rotor. In practice, in particular with turbomachines, it has been found that resonances involving excitation frequencies of order greater than 3 are of intensities that are sufficiently small for it to be possible to ignore them. It is thus usually possible to make do with the first three excitation frequencies (P=3). With the natural frequencies of the rotor, it is possible to consider only those natural frequencies that might coincide with at least one of the excitation frequencies N, 2N, 3N, . . . PN in a range of speeds of rotation at which the rotor is designed to rotate. To clarify the drawing, only three natural frequencies $f_1$, $f_2$, and $f_3$ and only three corresponding straight lines D1, D2, and D3 are shown in FIG. 7.

Since steps E1 and E2 are well known to the person skilled in the art there is no need to describe them in greater detail herein.

In the following step E3, possible coincidences between the natural frequencies of the rotor and the excitation frequencies are identified in the Campbell diagram within the range of speeds of rotation at which the rotor is to rotate.

If the range of speeds of rotation of the rotor is of the type corresponding to the range ΔV1 shown in FIG. 7, in which no coincidence is identified (which means that although coincidences involving excitation frequencies of order greater than P=3 might exist in theory, they do not give rise to significant resonance effects), a uniform angular distribution is selected for the fixed sources of disturbance in step E4. With this uniform distribution, the angles $\alpha_1$ to $\alpha_N$ are all equal to one another, and the stator is of the type shown in FIG. 6.

However, if one or more coincidences exist, as is the case for the range of speeds of rotation ΔV2 shown in FIG. 1, then a non-uniform angular distribution is selected for the fixed sources of disturbance in step E5 in order to modify the excitation spectrum as seen by the rotor and thereby avoid the disturbances generated by the stator excessively exciting the rotor. In the example of FIG. 7, a coincidence exists in the range ΔV2 between the natural frequency $f_1$ of the rotor and the excitation frequency NV at a speed V0. This coincidence is represented by the point of intersection PI between the straight lines D1 and $D_1'$.

Examples of types of distribution suitable for selection for implementation in step E5 are described below.

Throughout the description below, the term "nominal" angle is used to mean an angle equal to 360°/N, the term "large" angle is used to mean an angle that is greater than 360°/N, and the term "small"[1] angle is used to mean an angle less than 360°/N. In the figures, the symbol "=" represents a nominal angle, the symbol "+" represents a large angle, and the symbol "−" represents a small angle.

First Type of Distribution

Figure 8:
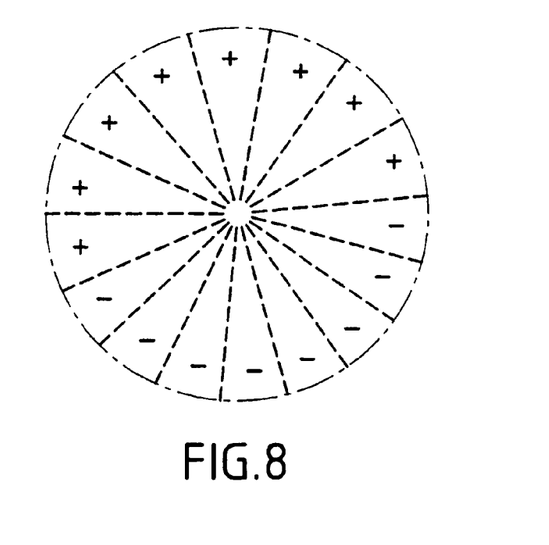
FIGS. 8 to 14 show various examples of angle distributions in accordance with the present invention, for the sources of disturbance present in the portion of a turbomachine shown in FIG. 5.

In a first type of distribution, the set of adjacent angles is constituted by:
- a single group of adjacent large angles equal to (360°/N)+c; and
- a single group of adjacent small angles equal to (360°/N)−c;

where $c$ is a real number such that 0<c<360°/N.

FIG. 8 shows an example of this type of distribution.

Second Type of Distribution

Figure 9:
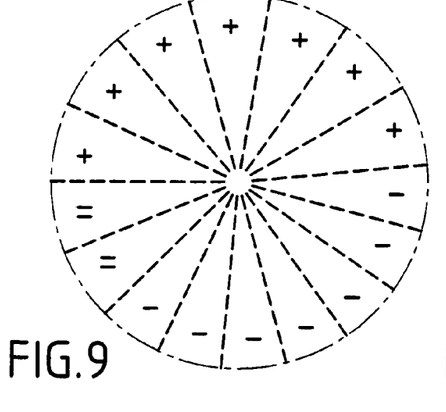

In a second type of distribution, the set of adjacent angles is constituted by:
- a single group of adjacent large angles equal to (360°/N)+c;
- a single group of adjacent small angles equal to (360°/N)−c, this group being adjacent to the group of large angles; and
- a nominal angle or a group of adjacent nominal angles interposed between the group of adjacent large angles and the group of adjacent small angles;

where $c$ is a real number such that 0<c<360°/N.

FIG. 9 shows an example of this type of distribution, including one group of two adjacent nominal angles.

Third Type of Distribution

Figure 10:
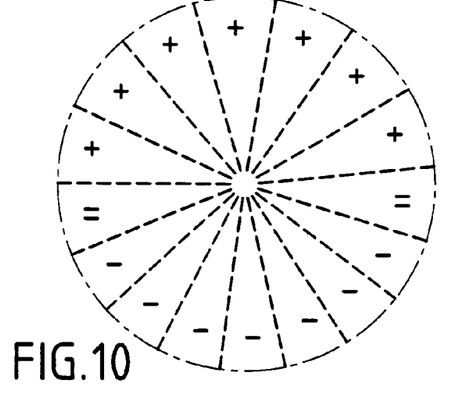
Figure 11:
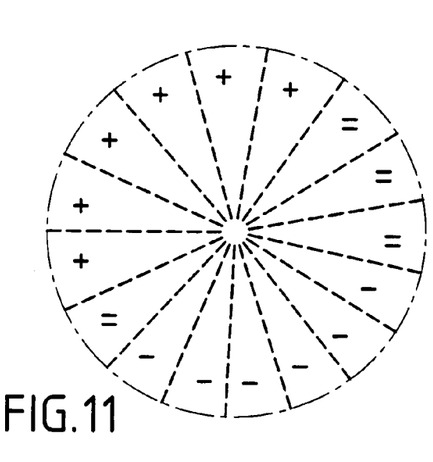

In a third type of distribution, the set of adjacent angles is constituted by:
- a single group of adjacent large angles equal to (360°/N)+c;
- a first nominal angle or a first group of adjacent nominal angles adjacent to the above-specified group of adjacent large angles;
- a single group of adjacent small angles equal to (360°/N)−c, this group being adjacent to said first nominal angle or first group of adjacent nominal angles; and
- a second nominal angle or a second group of adjacent nominal angles adjacent to the above-specified groups of adjacent small angles and of adjacent large angles;

where $c$ is a real number such that 0<c<360°/N.

FIG. 10 shows an example of this type of distribution, having two separate nominal angles each interposed between the groups of adjacent large and small angles.

FIG. 11 shows another example of this type of distribution, having a nominal angle interposed between the groups of adjacent large and small angles, and a group of adjacent nominal angles, opposite the nominal angle, and likewise interposed between the groups of adjacent large and small angles.

Fourth Type of Distribution

Figure 12:
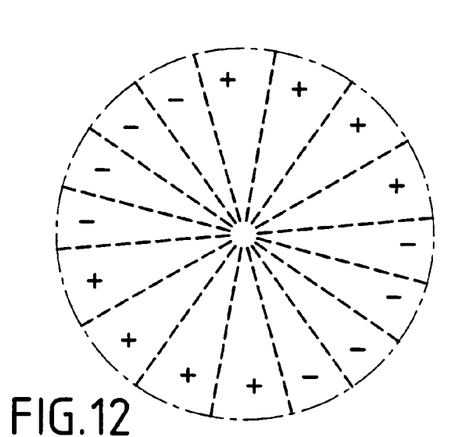
Figure 13:
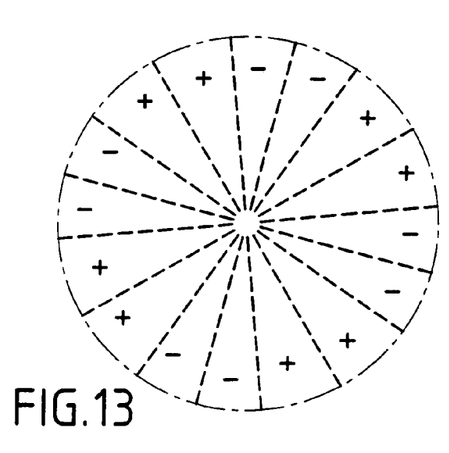

In a fourth type of distribution, the set of adjacent angles is constituted by:
- a plurality of groups of adjacent large angles, each large angle being equal to (360°/N)+c; and
- a plurality of groups of adjacent small angles, said groups being interposed between the groups of adjacent large angles, and each small angle being equal to (360°/N)−c;

where $c$ is a real number such that 0<c<360°/N.

FIGS. 12 and 13 show examples of this type of distribution.

Fifth Type of Distribution

Figure 14:
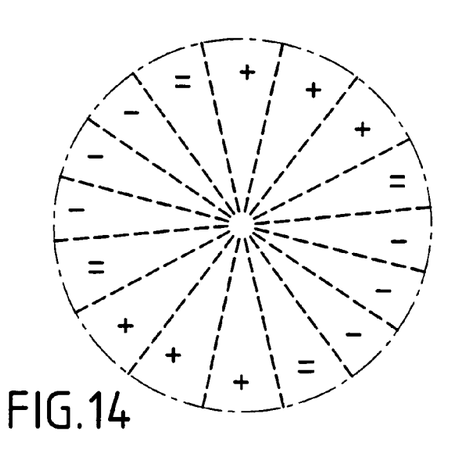

In a fifth type of distribution, the set of adjacent angles is constituted by:
- a plurality of groups of adjacent large angles, each large angle being equal to (360°/N)+c;
- a plurality of groups of adjacent small angles, the groups being interposed between the groups of adjacent large angles, and each small angle being equal to (360°/N)−c; and
- at least one nominal angle;

where $c$ is a real number such that 0<c<360°/N.

FIG. 14 shows an example of this type of distribution.

Sixth Type of Distribution

In a sixth type of distribution, the set of adjacent angles is constituted by:
- a plurality of groups of adjacent large angles, each large angle being equal to (360°/N)+c;
- a plurality of groups of adjacent small angles, the groups being interposed between groups of adjacent large angles, each small angle being equal to (360°/N)−c; and
- a plurality of nominal angles or a plurality of groups of adjacent nominal angles, each nominal angle or each group of adjacent nominal angles being adjacent both to one of said groups of adjacent large angles and to one of said groups of adjacent small angles;

where $c$ is a real number such that 0<c<360°/N.

The scheme of FIG. 14 is likewise an example of this type of distribution.

Other Types of Distribution

In each of the six types of distribution set out above, the large angles (or small angles) are all equal to one another, and the total number of large angles is necessarily equal to the total number of small angles. Thus, in particular, the number N of sources of disturbance in the first and fourth types of distribution is necessarily even.

Nevertheless, it is possible to modify those six types of distribution so that the large angles (or small angles) are not all equal to one another. In other words, each of the six types of distribution given above can be modified in such a manner that the value $c$ is not constant but, on the contrary, differs from one angle to another. Under such circumstances, the number of large angles may be different from the number of small angles.

In the types of distribution of the invention, those having one or more nominal angles are preferred. The presence of nominal angles avoids sudden changes of angle between large angles and small angles, which changes can be harmful for the aerodynamic behavior of the stator.

In addition, for the same reasons of aerodynamic efficiency, it is preferable for the large angles (and also the small angles) to differ from 360'/N by no more than 10%, and preferably by no more than 5%, i.e. for the value $c$ to be less than or equal to 36/N or even less than or equal to 18/N.

The types of distribution described above all show the common features of being firstly non-regular and secondly of having at least two large angles adjacent to each other and at least two small angles adjacent to each other.

Compared with the conventional configuration in which the sources of distribution are regularly distributed (cf. FIG. 1), the frequency spectrum of the excitation as seen by the rotor and produced by the same sources of disturbance, but distributed in non-uniform manner includes additional spectrum lines. Each large angle contributes to the following spectrum lines being present in the excitation frequency spectrum:

$$(360°/((360°/N)+c))V;$$

$$2\times(360°/((360°/N)+c))V;$$

$$3\times(360°/((360°/N)+c))V;$$

etc.;

and each small angle contributes the following spectrum lines:

$$(360°/((360°/N)-c))V;$$

$$2\times(360°/((360°/N)-c))V;$$

$$3\times(360°/((360°/N)-c))V;$$

etc.

This enrichment in additional spectrum lines is accompanied by a reduction in the intensity of each spectrum line corresponding to excitation frequencies NV to PNV, and thus in particular, in the example of FIG. 7, to the troublesome line corresponding to the frequency NV which coincides with the natural frequency $f_1$ at point PI (when the speed of rotation V is equal to V0). The intensity of the resonance due to the troublesome frequency NV0 is thus reduced. The rotor 2 will thus vibrate less than it would in the conventional case when in operation it is rotating at the speed V0.

This effect is reinforced by the fact that at least two large angles are adjacent to each other and at least two small angles are adjacent to each other. Such a grouping together of large angles (or of small angles) contributes to increasing the intensities of frequency lines that are multiples of the frequency $(360°/((360°/N)+c))V$ (or of the frequency $(360°/((360°/N)-c))V$).

Figure 15:
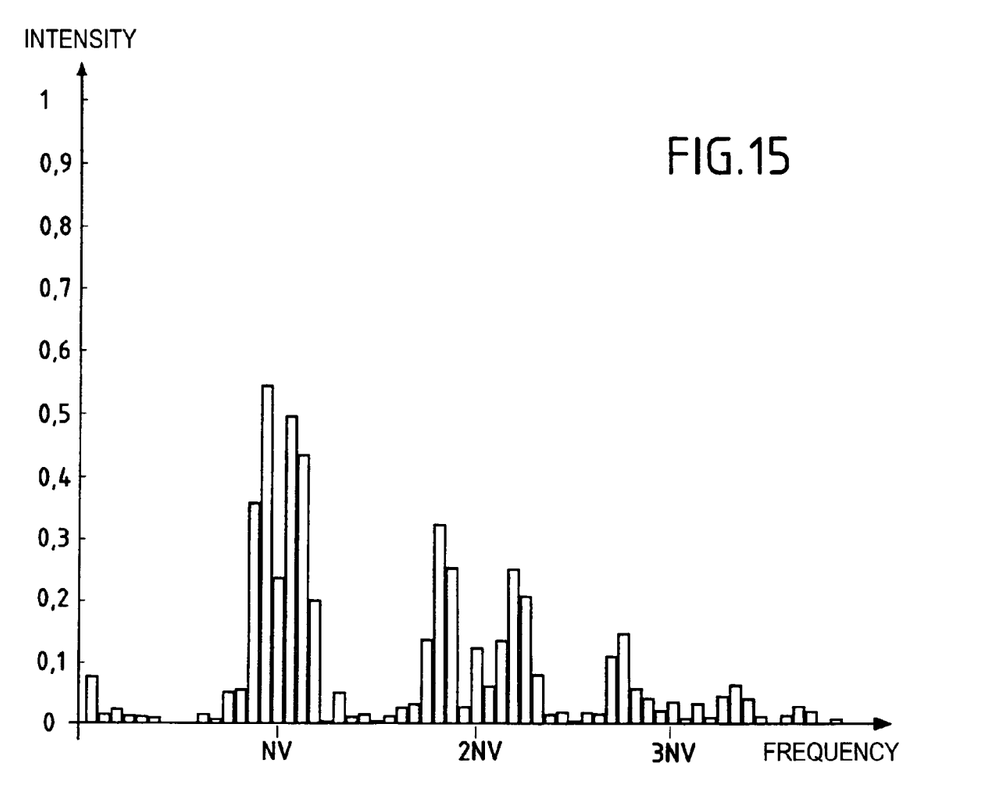
FIG. 15 shows the frequency spectrum of excitation as seen by a rotor in the portion of a turbomachine shown in FIG. 5, corresponding to the angular distribution shown in FIG. 10.

By way of illustration, FIG. 15 shows the excitation spectrum as seen by the rotor for the distribution example shown in FIG. 10. In FIG. 15, the intensities of the spectrum lines are normalized relative to the intensity of the spectrum line at frequency NV in the spectrum of FIG. 2 which corresponds to the conventional case. The maximum intensity of value 1 thus corresponds to the intensity of the line at frequency NV when the N sources of disturbance are regularly distributed. In FIG. 15, it can be seen that;
the intensities of the excitation spectrum lines are all well below 1, and thus all below the intensity of the line at frequency NV in the conventional case; and
the intensities of the spectrum line at frequency NV (or 2NV, or 3NV) and of the spectrum lines at frequencies adjacent to NV (or 2NV, or 3NV) are all well below the intensity of the spectrum line at frequency NV (or 2NV, or 3NV) in the conventional case.

As a result, the resonance amplitudes that might occur during operation of the turbomachine are smaller than in the conventional case.

In some rather rare cases, it can nevertheless happen that by modifying the angular distribution of the sources of disturbance in step E5 of the method of the invention, in order to move away from a troublesome coincidence between a natural frequency of the rotor and an excitation frequency, rotor vibration does not decrease. Such situations can arise only under conditions that are very specific, namely when, at a given speed of rotation of the rotor, the effects of resonance due to the new spectrum lines accumulate in such a manner as to become equal to or greater than the initial resonance effect.

In step E6 of the method of the invention, provision is therefore made to verify that the distribution selected in the preceding step E5 does indeed lead to a reduction of rotor vibration.

Figure 16:
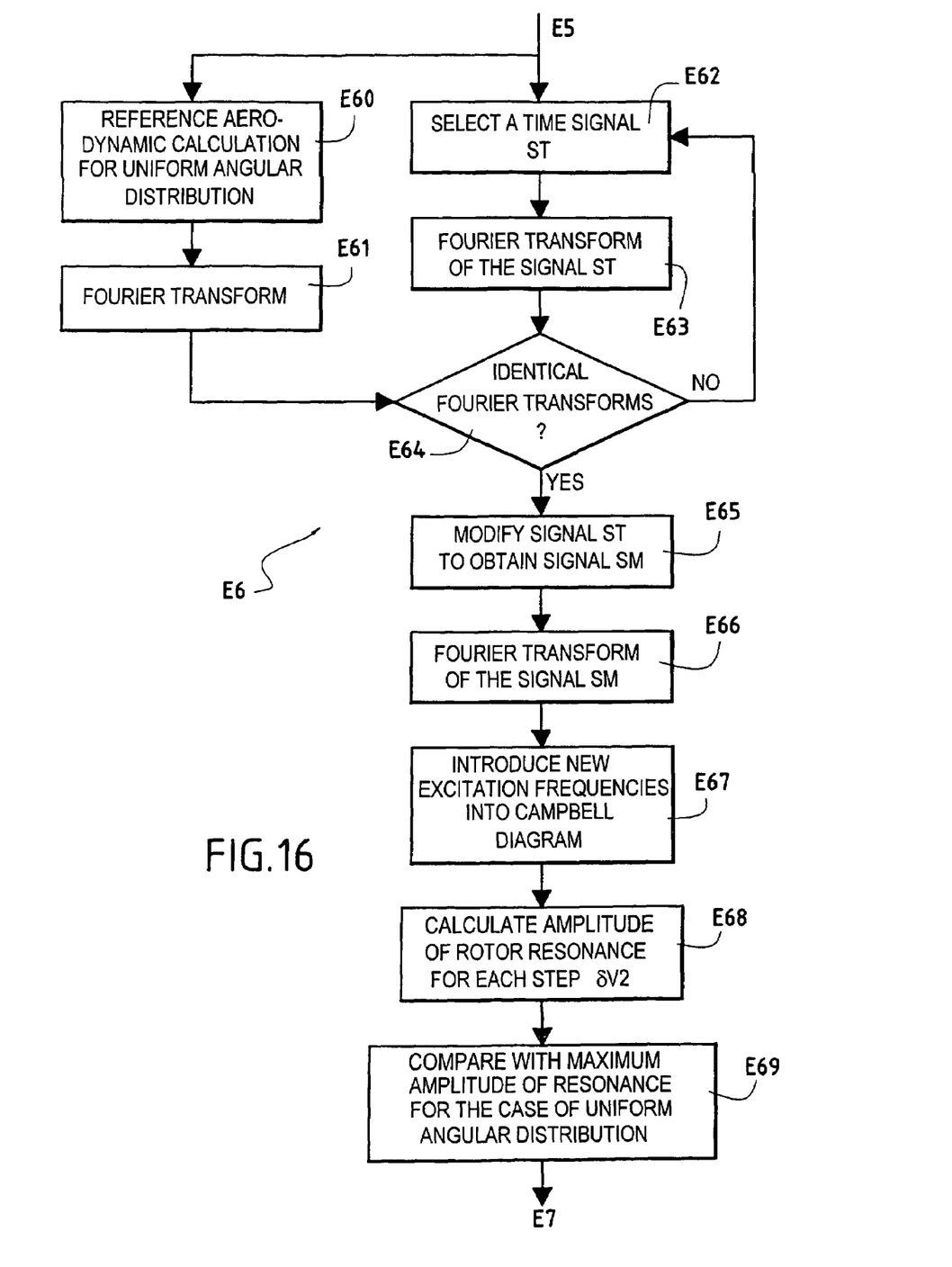
FIG. 16 is a flow chart for a verification method in accordance with the present invention.

Step E6 is implemented using a method which is shown in detail in FIG. 16. This method consists in general in initially calculating the excitation frequency spectrums as seen by the rotor in the conventional case of a uniform angular distribution of the sources of disturbance (FIG. 2) and in the case of the non-uniform angular distribution selected in step E5 (FIG. 15), and then in comparing the resonance amplitudes obtained in both cases.

More precisely, in step E60 and E61, the excitation frequency spectrum as seen by the rotor is determined for an angular distribution of sources of disturbance that is uniform by performing an aerodynamic calculation of known type (step E60) followed by a Fourier transform (step 61).

Figure 17:
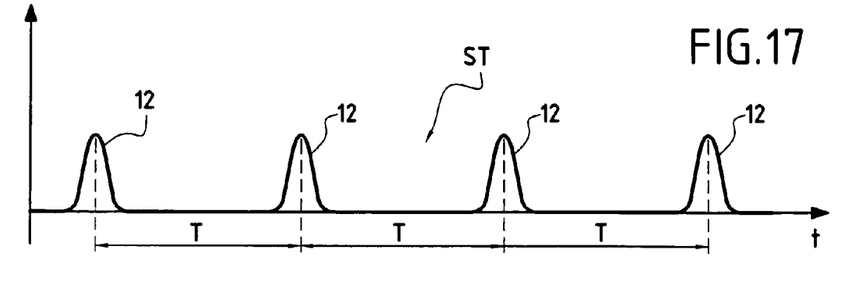
FIG. 17 shows a time signal used in the method of FIG. 16.

In a step E62, a time or angle signal ST is selected that is representative of variation over time in the excitation seen by the rotor, or, which comes to the same thing, representative of the way the excitation seen by the rotor varies as a function of the angle of rotation of the rotor. As shown in FIG. 17, the signal ST comprises identical peaks 12, e.g. of Gaussian shape, and it is periodic. The period T of this signal, if it is a time signal, is equal to $\alpha/(360°0\times V)$, where $\alpha$ is the constant angle defined by two consecutive sources of disturbance (specifically two stator blades). Each peak 12 represents the disturbance induced by a source of disturbance.

In a step E63, a Fourier transform is applied to the signal ST.

In a following step E64, the Fourier transform obtained in step E63 is compared with the transform obtained in step E61. If the two Fourier transforms are identical, a step E65 is implemented. Otherwise, the time signal ST is modified (step E62) by acting on the (common) shape of the peaks 12 until a signal ST is obtained whose Fourier transform corresponds to that obtained in step E61.

Figure 18:
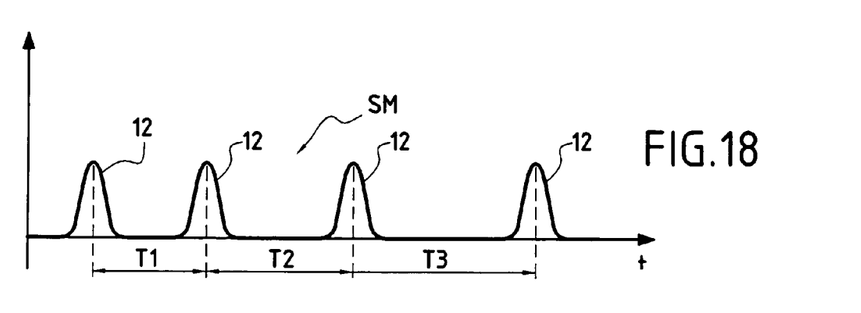
FIG. 18 shows a modified time signal derived from the time signal of FIG. 17.

In step E65, the time signal ST is modified into a signal SM as shown in FIG. 18 as a function of the modification applied to the angular distribution of the sources of disturbance in step E5 of the method of the invention. More particularly, as shown in FIG. 18, the spacing between two consecutive peaks is adapted to the new, non-uniform angular distribution of the sources of disturbance. Thus, this spacing is no longer constant as in the case of FIG. 17, but varies as a function of the angles of distribution of the sources of disturbance. In the example of FIG. 18, the time intervals T1, T2, and T3 satisfy the following relationships:

$$T1 = \alpha small/(360°\times V)$$

$$T2 = \alpha nom/(360°\times V);$$

$$T3 = \alpha large/(360°\times V);$$

where $\alpha$small, $\alpha$nom, and $\alpha$large designate respectively a small angle, a nominal angle, and a large angle.

In a following step E66 of the method shown in FIG. 16, a Fourier transform is applied to the modified time signal SM. This produces a spectrum of the type shown in FIG. 15. In FIG. 15, as explained above, the scale on which intensity is plotted up the ordinate is the same as in FIG. 2. The maximum intensity is normalized to a value 1, and corresponds in both figures to the intensity of the spectrum line of frequency NV in the conventional case. The total excitation energy generated by the sources of disturbance remains the same regardless of the angular distribution of said sources of disturbance, so the relative intensities of the spectrum lines in FIG. 15 are known with precision relative to the intensities of the spectrum lines in the conventional case (FIG. 2).

Steps E60 to E66 of the invention thus enable the excitation spectrum as seen by the rotor to be obtained for the case of the sources of disturbance being in a non-uniform angular distribution while avoiding the very lengthy and complex calculations that would be necessary if the spectrum were to be determined directly by aerodynamic calculations.

In a following step E67, the straight lines representing the relationship between the new frequencies that appear in the excitation frequency spectrum are plotted in the Campbell diagram (two of these lines being referenced D1" and D2", and are shown in dashed lines in FIG. 7), i.e. for frequencies other than the frequencies NV, 2NV, 3NV, etc. and the speed of rotation of the rotor. Thereafter, any coincidences between these new frequencies and the natural frequencies of the rotor are identified in the range ΔV2 of speeds of rotation in which the rotor is to rotate.

By way of illustration, in FIG. 7, points of intersection P1 and P2 are shown between the straight lines D1 and D1" and between the straight lines D2 and D2", respectively. At each of the points of coincidence P1 and P2, which corresponds to a respective speed of rotation V1 or V2, the rotor is subject to resonance. If the speeds of rotation V1 and V2 are close to each other, the effects of resonance at the points P1 and P2 can be cumulative, in part.

In the invention, in a step E68, it is determined for each speed of rotation in the range ΔV2 whether one or more points of coincidence exist, and if so, the amplitude of the overall resonance of the rotor is calculated at this speed of rotation by a known technique of mode superposition. More precisely, the range ΔV2 is subdivided into narrow speed intervals δV2 with the width of each speed interval depending on the damping of the rotor (i.e. about 0.5% of the speed V). An overall resonance amplitude of the rotor is calculated by mode superposition for each of the intervals δV2, and is then compared with the amplitude of resonance in the conventional case when the rotor is rotating at the speed V0 (step E69).

Figure 4:
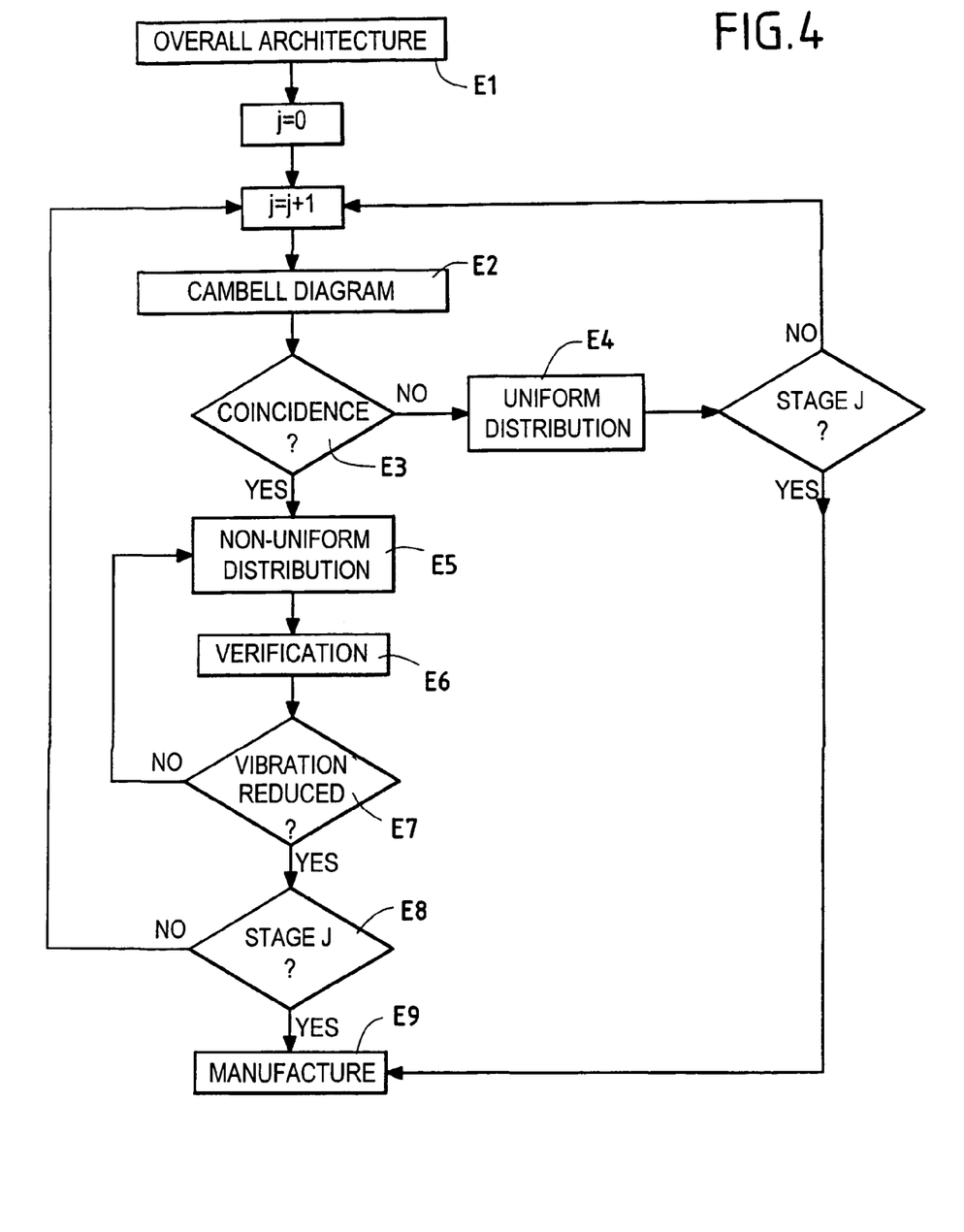
FIG. 4 is a flow chart for a method of designing and manufacturing a turbomachine in accordance with the present invention.

If for each interval δV2 the amplitude of overall resonance of the rotor is less than the amplitude of maximum resonance in the conventional case, then the non-uniform angular distribution selected in step E5 is validated and steps E2 to E6 are then repeated for the following stator-rotor stage (cf. steps E7 and E8 in FIG. 4).

If, exceptionally, one of the amplitudes of overall resonance is equal to or greater than the maximum amplitude of resonance in the conventional case, then the method returns to step E5 to select another non-uniform angular distribution, and the validation step E6 is repeated (although naturally without repeating steps E60 and E61).

Once the steps E2 to E7 shown in FIG. 4 have been implemented for all of the stator-rotor stages (step E8), the turbomachine as designed above and in the form of simulation digital data, is manufactured (step E9).

In the various embodiments of the invention described above, the sources of disturbance are constituted by stator blades. Nevertheless, the present inventors have observed that the principle of the invention can be applied to other types of sources of disturbance that are to be found in a turbomachine, such as injectors in a combustion chamber, elements for extracting cooling air, discharge valves, elements for re-injecting cooling air, sensors or probes, placed upstream from one or more rotors in the turbomachine.

Figure 19:
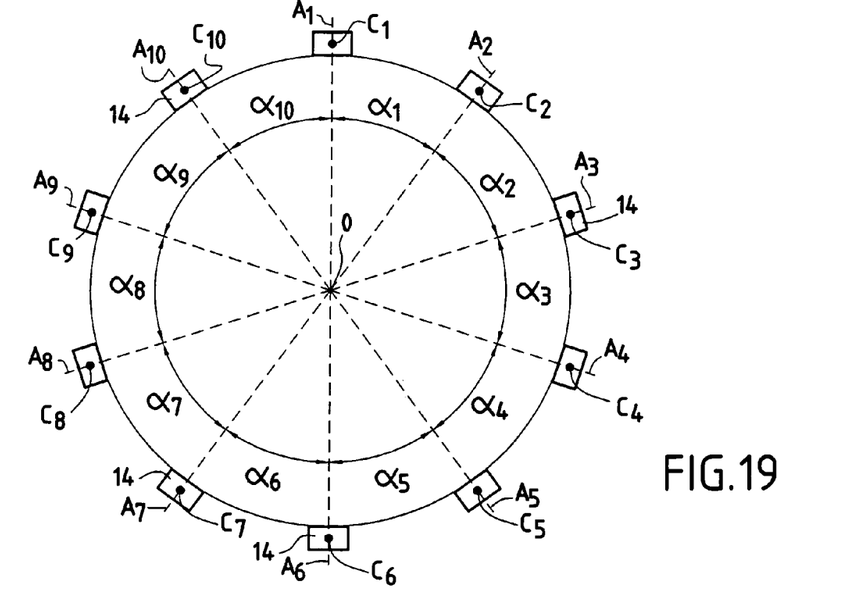
FIG. 19 shows a set of fixed sources of disturbance in a variant of the present invention.

FIG. 19 is a diagram showing a set of N sources of disturbance 14 of one of the above-specified types (in the example of FIG. 19, the number N of sources of disturbance is equal to 10), and forming part of a stator. As for stator blades (FIG. 6), the sources of disturbance 14 are identical (ignoring manufacturing tolerances) and they are distributed at adjacent angles $\alpha_1$ to $\alpha N$ giving a sum equal to 360°, each angle being defined by two half-lines $A_i, A_{i+1}$ having as their origin the same point O corresponding substantially in the fluid flow 11 to the center(s) of rotation of the rotor(s) situated downstream, and passing respectively via the geometrical centers $C_i$, $C_{i+1}$ of two consecutive sources of disturbance.

The sources of disturbance 14 are generally at the same radial position, i.e. they are situated at the same distance from the point O. The set of sources of disturbance 14 is disposed substantially perpendicularly to the fluid flow, and in the fluid flow, it gives rise to disturbances which can be received by the rotor(s) downstream.

With sources of disturbance of the type shown in FIG. 19, the method of the invention as illustrated in FIG. 4 is implemented in substantially the same manner as for sources of disturbance constituted by stator blades. More specifically, for each rotor affected by disturbances generated by the sources of disturbance 14, steps E2 to E7 that are identical to those shown in FIG. 4 are implemented.

Although the present invention is described above in the context of a turbomachine having a plurality of rotors, it can clearly be seen by the person skilled in the art that the principle of the invention can be applied to any structure having at least one rotor and at least one set of fixed sources of disturbance that are liable to disturb the rotor(s). When the structure has a plurality of sets of sources of disturbance, it is appropriate to begin by identifying for the or each rotor which set of sources of disturbance generates the greatest amounts of disturbance as seen from the rotor. In the configuration shown in FIG. 5, this set is generally the fixed bladed wheel situated immediately upstream from the rotor. If there is no fixed bladed wheel upstream from the rotor and close enough thereto to disturb it, it is appropriate to determine whether other sources of disturbance such as injectors in a combustion chamber, elements for extracting cooling air, discharge valves, elements for re-injecting cooling air, sensors or probes are to be found upstream from the rotor. If so, then the most troublesome sources of disturbance are generally those which are closest to the rotor, and upstream therefrom.

Although, for a given rotor, the sources of disturbance that are the most troublesome are usually situated upstream from the rotor, situations can arise in which the rotor is disturbed mainly by sources of disturbance located downstream therefrom (in particular when there is no set of sources of disturbance present upstream from the rotor). The present invention is thus not limited to a particular position for the set of sources of disturbance relative to the rotor.

In general, the person skilled in the art will understand that the invention is not limited to the particular examples described, and in particular that a principle of the method of the invention consists in selecting an annular distribution for fixed sources of disturbance in such a manner as to reduce the amplitude of excitation as seen by the rotor for at least one excitation frequency that substantially coincides with a natural frequency of the rotor at a speed of rotation V thereof, as compared with an initially projected annular distribution.

The invention claimed is:

1. A method of reducing vibration in a structure including at least one rotor and at least one stator, the rotor and the stator configured to be subjected to a fluid flow, the structure including a set of fixed sources of disturbance liable to give rise to disturbances in the fluid flow that cause the rotor to vibrate, the method comprising:

during design of the structure, selecting a non-uniform angular distribution for the fixed sources of disturbance to reduce the amplitude of excitation seen by the rotor and corresponding to said disturbances at at least one excitation frequency that coincides substantially with a natural frequency of the rotor at a speed of rotation V thereof, as compared with a predetermined uniform angular distribution of the fixed sources of disturbance; and verifying over an entire range of speeds of rotation at which the rotor is liable to rotate and including the speed of rotation V, that a maximum amplitude of a response of the rotor to the excitation when the fixed sources of disturbance are distributed in said selected angular distribution is less than a maximum amplitude when the fixed sources of disturbance are distributed in said predetermined angular distribution, said response of the rotor to the excitation when the fixed sources of disturbance are distributed in said selected angular distribution being obtained by:

determining a first signal whose Fourier transform corresponds to a frequency spectrum of the excitation when the fixed sources of disturbance are distributed in said predetermined angular distribution;

modifying the first signal into a second signal adapted to said selected angular distribution for the fixed sources of disturbance;

determining the frequency spectrum of the excitation by calculating the Fourier transform of the second signal; and calculating the response of the rotor to the excitation based on the frequency spectrum of the excitation.

2. A method according to claim 1, wherein the fixed sources of disturbance are identical; and at least one natural frequency of the rotor at the speed of rotation V is substantially equal to NV or a multiple of NV, where N is the number of fixed sources of disturbance in said set.

3. A method according to claim 1, wherein the first signal includes identical peaks that are regularly spaced apart, each peak being representative of a disturbance created by a fixed source of disturbance in the fluid flow, the spacing between two given consecutive peaks being representative of an angle defined by two consecutive sources of disturbance when the sources of disturbance are distributed in said uniform angular distribution, and the modifying operation includes adapting the spacings between the peaks to the angles of said selected angular distribution.

4. A method according to claim 1, wherein the set of fixed sources of disturbance is upstream from the rotor in the fluid flow.

5. A method according to claim 1, wherein the set of fixed sources of disturbance is downstream from the rotor in the fluid flow.

6. A method according to claim 1, wherein the fixed sources of disturbance are substantially in a same radial position relative to a point in the fluid flow corresponding to a center of rotation of the rotor.

7. A method according to claim 1, wherein the fixed sources of disturbance are stator blades.

8. A method according to claim 1, wherein the fixed sources of disturbance are selected from the group consisting of injectors of: a combustion chamber; elements for extracting cooling air; discharge valves; elements for re-injecting cooling air; sensors; and probes.

9. A method of designing a structure including at least one rotor and at least one stator, the rotor and the stator configured to be subjected to a fluid flow, the structure including a set of fixed sources of disturbance liable to give rise to disturbances in the fluid flow causing the rotor to vibrate, the method comprising:

determining an overall architecture for the structure; and
applying to said structure the method of reducing vibration according to claim 1.

10. A method of designing and manufacturing a structure including at least one rotor and at least one stator, the rotor and the stator configured to be subjected to a fluid flow, the structure including a set of fixed sources of disturbance liable to give rise to disturbances in the fluid flow causing the rotor to vibrate, the method comprising:

determining an overall architecture for the structure;
applying to said structure the method of reducing vibration according to claim 1; and
manufacturing said structure.

11. A method according to claim 10, wherein an angular distribution for the fixed sources of disturbance is selected to obtain a structure comprising:

at least one rotor;
at least one stator; and
at least one set comprising a number N of fixed sources of disturbance;
the rotor and the set of fixed sources of disturbance configured to have a fluid flow passing substantially perpendicularly therethrough, in which flow the set of sources of disturbance is liable to give rise to disturbances that are subsequently received by the rotor;
the set of sources of disturbance forming a set of N adjacent angles in a plane substantially perpendicular to the fluid flow, where a sum of said angles is equal to 360°, each angle being defined by two consecutive half-lines having a common point as their origin, which point corresponds, in the fluid flow, to a center of rotation of the rotor, the half-lines also passing through respective geometrical centers of two sources of disturbance;
wherein the structure the set of adjacent angles comprises at least one group of first angles that are greater than 360°/N, and at least one group of second angles that are less than 360°/N.

12. A method according to claim 1, wherein the structure includes a turbomachine.

13. A structure comprising:
at least one rotor;
at least one stator; and
at least one set comprising a number N of fixed sources of disturbance;
the rotor and the set of fixed sources of disturbance configured to have a fluid flow passing substantially perpendicularly therethrough, in which flow the set of sources of disturbance is liable to give rise to disturbances that are subsequently received by the rotor;

the set of sources of disturbance forming a set of N adjacent angles in a plane substantially perpendicular to the fluid flow, where a sum of said angles is equal to 360°, each angle being defined by two consecutive half-lines having a common point as their origin, which point corresponds, in the fluid flow, to a center of rotation of the rotor, the half-lines also passing through respective geometrical centers of two sources of disturbance;

wherein in the structure the set of adjacent angles comprises at least one group of first angles that are greater than 360°/N, and at least one group of second angles that are less than 360°/N, wherein the set of adjacent angles is constituted by:
a single group of adjacent first angles;
a first nominal angle or a first group of adjacent nominal angles, adjacent to said single group of adjacent first angles;
a single group of adjacent second angles that are adjacent to said first nominal angle or to said first group of adjacent nominal angles; and
a second nominal angle or a second group of adjacent nominal angles, adjacent to said single group of adjacent second angles.

14. A structure according to claim 13, wherein the set of adjacent angles includes at least one nominal angle that is equal to 360°/N.

15. A structure according to claim 14, wherein the set of adjacent angles comprises a plurality of groups of adjacent first angles and a plurality of groups of adjacent second angles.

16. A structure according to claim 14, wherein the set of adjacent angles comprises a single group of adjacent first angles and a single group of adjacent second angles.

17. A structure according to claim 13, wherein the set of adjacent angles is constituted by a single group of adjacent first angles and a single group of adjacent second angles.

18. A structure according to claim 13, wherein the set of adjacent angles is constituted by a plurality of groups of adjacent first angles and a plurality of groups of adjacent second angles, each group of adjacent second angles being adjacent to two groups of adjacent first angles.

19. A structure according to claim 13, wherein all of the first angles in the set of adjacent angles are made larger by a same predetermined value, and all of the second angles in the set of adjacent angles are made smaller by said predetermined value.

20. A structure according to claim 13, wherein at least two first angles and/or at least two second angles in the set of adjacent angles are different from each other.

21. A structure according to claim 13, wherein the set of adjacent angles comprises as many first angles as second angles.

22. A structure according to claim 13, wherein each first angle and each second angle in the set of adjacent angles differs from 360°/N by no more than 10%.

23. A structure according to claim 13, wherein each first angle and each second angle in the set of adjacent angles differs from 360°/N by no more than 5%.

24. A structure according to claim 13, wherein the fixed sources of disturbance are in substantially a same radial position relative to an origin point.

25. A structure according to claim 13, wherein the set of fixed sources of disturbance is upstream from the rotor in the fluid flow.

26. A structure according to claim 13, wherein the set of fixed sources of disturbance is downstream from the rotor in the fluid flow.

27. A structure according to claim 13, wherein the structure includes a turbomachine.

28. A structure according to claim 13, wherein the fixed sources of disturbance are stator blades.

29. A structure according to claim 13, wherein the fixed sources of disturbance are selected from the group consisting of: injectors of a combustion chamber; elements for extracting cooling air; discharge valves; elements for re-injecting cooling air; sensors; and probes.

30. A structure comprising:
at least one rotor;
at least one stator; and
at least one set comprising a number N of fixed sources of disturbance;
the rotor and the set of fixed sources of disturbance configured to have a fluid flow passing substantially perpendicularly therethrough, in which flow the set of sources of disturbance is liable to give rise to disturbances that are subsequently received by the rotor;
the set of sources of disturbance forming a set of N adjacent angles in a plane substantially perpendicular to the fluid flow, where a sum of said angles is equal to 360°, each angle being defined by two consecutive half-lines having a common point as their origin, which point corresponds, in the fluid flow, to a center of rotation of the rotor, the half-lines also passing through respective geometrical centers of two sources of disturbance;
wherein in the structure the set of adjacent angles comprises at least one group of first angles that are greater than 360°/N, and at least one group of second angles that are less than 360°/N.
wherein the set of adjacent angles comprises a plurality of nominal angles or a plurality of groups of adjacent nominal angles, each nominal angle or group of adjacent nominal angles being adjacent both to a group of adjacent first angles and to a group of adjacent second angles.

31. A structure according to claim 30, wherein the set of adjacent angles includes at least one nominal angle that is equal to 360°/N.

32. A structure according to claim 31, wherein the set of adjacent angles comprises a single group of adjacent first angles and a single group of adjacent second angles.

33. A structure according to claim 31, wherein the set of adjacent angles comprises a plurality of groups of adjacent first angles and a plurality of groups of adjacent second angles.

34. A structure according to claim 30, wherein the set of adjacent angles is constituted by a single group of adjacent first angles and a single group of adjacent second angles.

35. A structure according to claim 30, wherein the set of adjacent angles is constituted by a plurality of groups of adjacent first angles and a plurality of groups of adjacent second angles, each group of adjacent second angles being adjacent to two groups of adjacent first angles.

* * * * *